US 6,655,859 B2

(12) United States Patent
Kamata (10) Patent No.: US 6,655,859 B2
(45) Date of Patent: Dec. 2, 2003

(54) SHUTTER DEVICE OF CAMERA (75) Inventor: Kazuo Kamata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/303,863

(22) Filed: Nov. 26, 2002

(65) Prior Publication Data

US 2003/0099473 A1 May 29, 2003

(30) Foreign Application Priority Data

Nov. 27, 2001 (JP) ........................................ 2001-360644

(51) Int. Cl.[7] ................................................ G03B 9/08
(52) U.S. Cl. ...................................... 396/449; 396/497
(58) Field of Search ............................ 396/6, 449, 497, 396/500, 501, 235

(56) References Cited

U.S. PATENT DOCUMENTS 5,255,037 A  * 10/1993  Kobayashi .................. 396/449
5,721,995 A  *  2/1998  Katsura et al. ............. 396/500
6,176,627 B1 *  1/2001  Suh ............................ 396/497

* cited by examiner

*Primary Examiner*—Christopher Mahoney
(74) *Attorney, Agent, or Firm*—Young & Thompson (57) ABSTRACT

A shutter device loaded in a fixed focus camera for making soft-focus photograph includes a swingable shutter drive member and two shutter blades for opening and closing a shutter opening. When the shutter drive member swings in response to photographing operation, the shutter blades rotate oppositely to each other such that the shutter opening gradually appears. While opening, the shutter blades continuously form a small stop. After a flashlight is emitted during forming the small stop, the shutter blades rotate moreover and the shutter opening is entirely exposed. Then the shutter blades close to cover the shutter opening entirely.

18 Claims, 5 Drawing Sheets

SHUTTER DEVICE OF CAMERA

BACKGROUND OF THE INVENTION

1. Field of the Invention

The present invention relates to a shutter device of a camera for carrying out a soft focus photography.

2. Description Related to the Prior Art

In a market is sold a cheap camera, in which a photo film can be changed and a focus mechanism and an exposure mechanism are omitted. Further, as a type of the cheap camera, a lens-fitted photo film unit is widely known, which includes a simple photographic mechanism and in which the filmstrip is previously loaded in producing process. The lens-fitted photo film unit can be used only once, and when a user thereof provides it to a photofinisher without removing the filmstrip, he can obtain a processed filmstrip and photo prints.

Such a sort of the camera has a simple structure to be produced in a low cost. For example, a fixed focus type of a taking lens is used, which is constructed of one or two lens elements, and a hitting type of the shutter device is used. In the hitting type, a swingable shutter blade is hit by a release lever, and thereafter swung back by bias of a spring.

As a method of portrait photography, there is a soft focus photograph. When a soft focus photograph is designated with use of a normal camera, a filter for the soft focus photography is provided in front of a taking lens of the normal camera. By making the soft focus photograph, a small part of an incident light into the taking lens irregularly reflects to form a portrait image whose outlines of objects are reproduced in a suitably smaller sharpness.

In the normal camera in which the focusing can be made, outlines in the image are adequately softened with the filter for the soft focus photography.

However, an inexpensive camera includes a taking lens of a fixed focus, which is likely to form a certain image out of focus. If the soft focus filter is combined with the fixed-focus camera, an out-of-focus image may be recorded also with softened portions at smaller sharpness, to result in an unacceptable photograph. If good image quality is intended at a low cost, no soft focus photography is available.

SUMMARY OF THE INVENTION

An object of the present invention is to provide a shutter device of a camera for soft focus photography, in which a fixed focus type of a taking lens is loaded.

In order to achieve the objects and other object of the present invention, in a shutter device of the present invention that is loaded in a camera, a shutter drive member is swung from a primary position to an end position in response with photographing operation. In accordance with the swing of the shutter drive member, a shutter blade moves between a closed position, a small stop position and an open position. In the closed position, the shutter blade entirely closes a shutter opening formed in a camera body of the camera. In the small stop position, a part of the shutter opening is exposed. In the open position, the shutter opening is entirely exposed. The shutter drive member is biased toward the closed position by a spring. The shutter drive member and the shutter blade are connected by a transmission member. Interlocking with the moving of the shutter drive member to the end position, the transmission member moves the shutter blade from the closed position to the small stop position, and further moves the shutter blade after setting to the small stop position for a predetermined time, so as to make the shutter opening entirely appear. Then, interlocking with the moving of the shutter drive member to the closed position by bias of the spring, the transmission member keeps the shutter blade in the small stop position for the predetermined time, and thereafter moves the shutter blade to the closed position, to cover the shutter opening with the shutter blade.

The camera in which the shutter device of the present invention is loaded includes a flash device for emitting a flashlight and a sync switch for the flash device. In order to drive the sync switch, the shutter drive member has a switch depressing portion. While the shutter blade is set to the small stop position for the predetermined time, the shutter drive member swings and thereby the switch depressing portion presses the sync switch. Thus the sync switch is turned ON.

The shutter blade is constructed of two rotatable blade members having a same rotary shaft, for rotating in directions opposite to one another. While the blade members rotate, the shutter opening gradually appears or is covered. Further, the transmission member is rotatable. An end of the transmission member has an end cam groove in which a cam pin of the shutter drive member is fitted, and another end of the transmission member has an end guide pin and is fitted in a guide groove formed in each of the blade members. In accordance with the swing of the transmission member, the end guide pin moves in the guide groove such that the blade members rotate oppositely to each other. Thus the swing of the shutter drive member is transmitted to the blade members.

According to the shutter device of the present invention, the stop having the predetermined size is temporarily kept in opening and closing the shutter blades. In the camera including the shutter device, an image with core formed through the small stop and a slightly softened image formed through the shutter opening are synthesized on the photo film. Accordingly, the soft focus photography adequate for the portrait photography can be carried out.

Further, in the camera, while the small stop having the predetermined size is formed, the flashlight is emitted. Accordingly, a sharp image formed through the small stop, and a slightly softened image formed through the entirely exposed shutter opening are synthesized on the photo film. Therefore, the soft focus photography adequate for the portrait photograph can be made.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
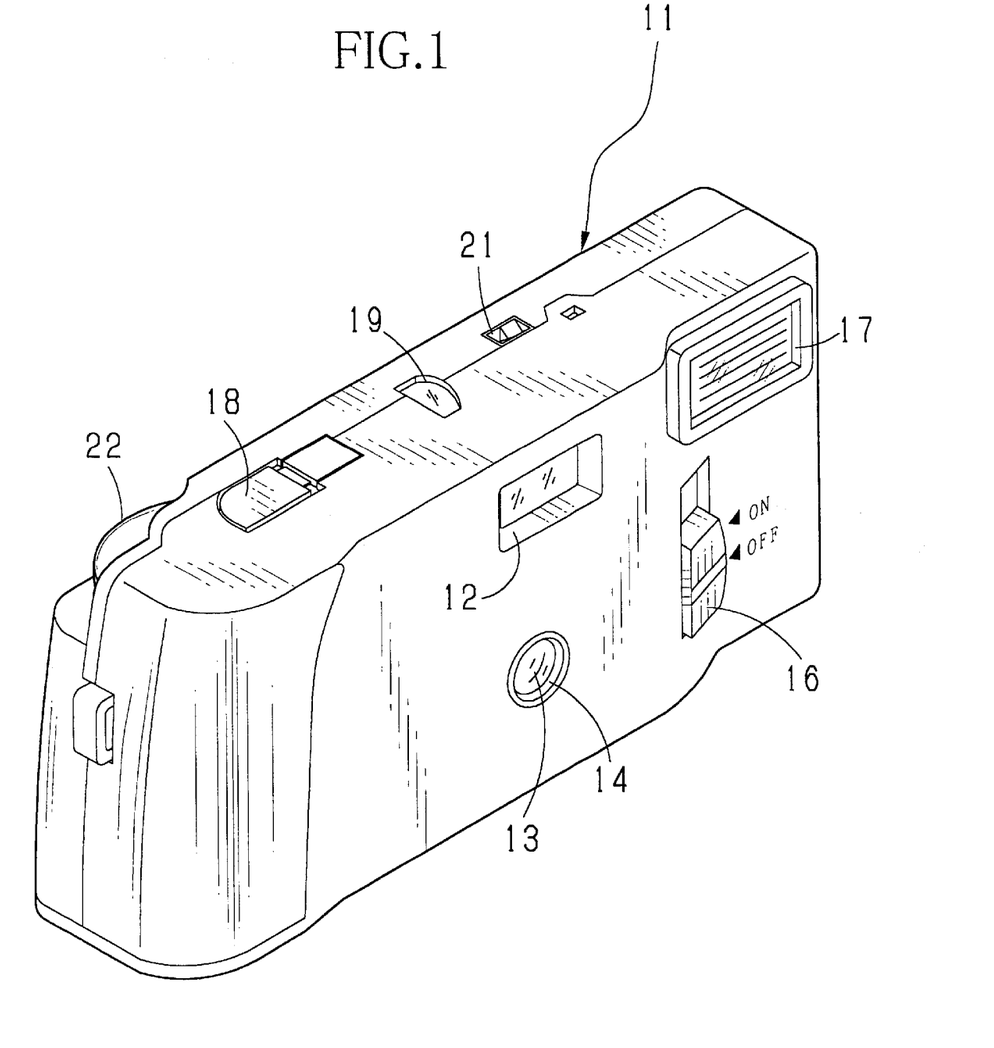
FIG. 1 is a perspective view of a lens-fitted photo film unit in which a shutter device of the present invention is loaded.

As shown in FIG. 1, a lens-fitted photo film unit 11 includes a taking lens 13, a flash operation member 16, a shutter release button 18, a front cover 31 and a rear cover 32. In the front cover 31 are formed an objective window 12 of a viewfinder, a lens opening 14 and a flashlight window 17. The taking lens 13 appears from the lens opening 14. A focal length F of the taking lens 13 is 32 mm, and a distance (object distance) from a photo filmstrip 34 (see FIG. 2) to an object is fixed to 6 m for forming a focused image of object.

A winding wheel 22 appears from the rear cover 32, and in the rear cover 32 an eye-piece window 23 (see FIG. 2) is formed. Further, between the front cover 31 and the rear cover 32, a frame counter window 19 and a charged state indicator window 21 are formed.

Figure 2:
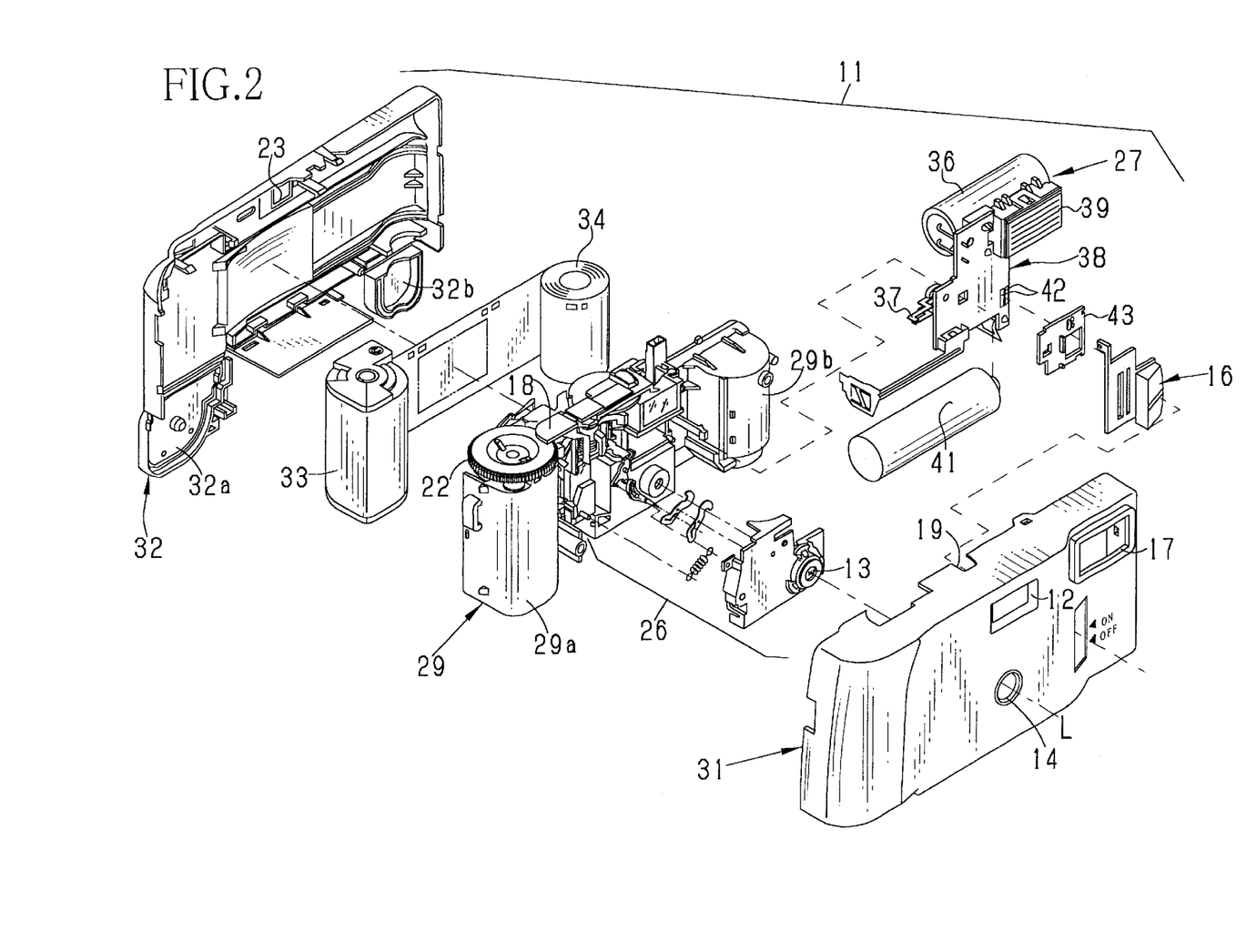
FIG. 2 is an exploded view of the lens-fitted photo film unit in FIG. 1.

As shown in FIG. 2, the lens-fitted photo film unit 11 includes a main body 29, a cartridge 33 and the photo film 34 inside the front and rear covers 31, 32. At both edges of the main body 29 are formed a cartridge chamber 29a and a film roll chamber 29b, and at a center of the front face of the main body 29 is assembled an exposure section 26 for making an exposure on the filmstrip 34. In the cartridge chamber 29a, the cartridge 33 is previously loaded. In the film roll chamber 29b a roll of the photo film 34 is provided. The photo film 34 is extended behind the main body 29, and an end is fixed to a spool (not shown) of the cartridge 33 for winding the exposed photo film 34. Note that a film sensitivity of the photo film 34 is ISO 400 in this embodiment.

The cartridge chamber 29a and the film roll chamber 29b are kept in a light-tight fashion by respective bottom lids 32a, 32b. The bottom lid 32a is opened before the cartridge 33 containing the photo film 34 after completion of exposure is removed.

The winding wheel 22 is attached to a top of the film roll chamber 29a. On a bottom of the winding wheel 22 a winding shaft (not shown) is formed for rotating a spool (not shown) of the cartridge 33. By rotating the winding wheel 22 every time after exposure, the photo film 34 is wound around the spool in the cartridge 33. In accordance with the operation of the winding wheel 22 to wind the photo film 34, a hitting lever 60 (see FIG. 3) provided for the main body 29 is set to a charged condition. Further, when the photo film 34 is wound for one frame, the rotation of the winding wheel 22 attached to the main body 29 is locked by a lock lever (not shown) assembled in the exposure section 26. On a rear face of the exposure section 26, an exposure aperture (not shown) is formed to determine an exposure area of a frame on the photo film 34.

A flash device 27 includes a main capacitor 36, a sync switch 37, a circuit board 38, a flashlight emitter 39 and a battery 41. The flashlight emitter 39 has a flash tube, a reflector (not shown) and the like. On the circuit board 38, a circuit pattern is printed and several sorts of circuit elements, such as a booster coil (not shown), are attached to form a flash circuit (not shown). A front face of the circuit board 38 is provided with a flash charger switch 42 consisting of a pair of switch segments. The sync switch 37 consists of a pair of segments 37a, 37b that are slightly apart from and confronting to each other. When the segments 37a, 37b contact, the sync switch 37 turns ON.

Further, on the front face of the circuit board 38, the flash operation member 16 is attached through a middle plate 43 so as to be slidable between ON and OFF positions. In the back side of the flash operation member 16, an actuate segment is attached for conducting between the segments of the flash charger switch 42. When the flash operation member 16 is slid into the ON position, the flash charger switch 42 is turned on with attachment of the actuate segment to start charging for emitting the flashlight.

Figure 3:
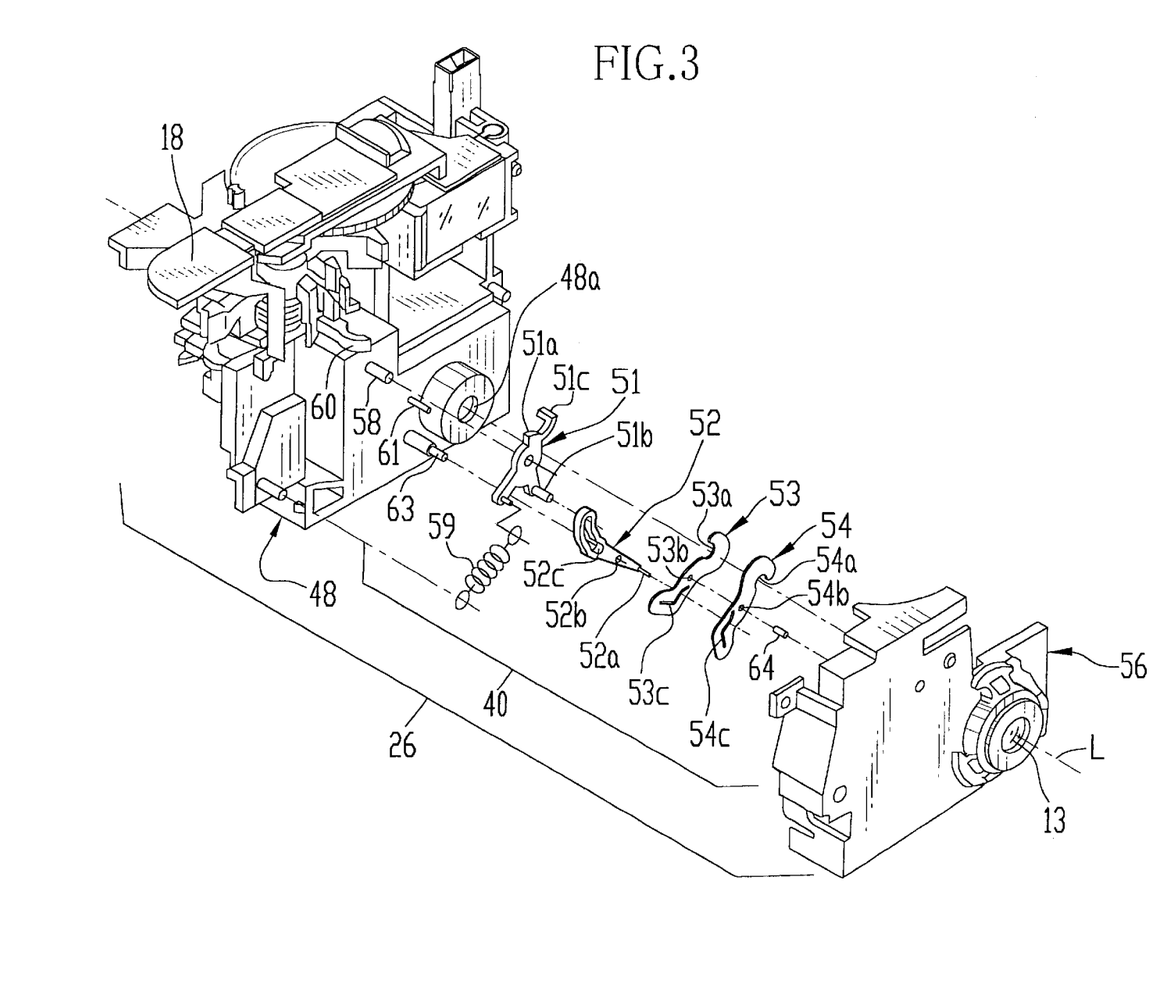
FIG. 3 is an exploded view of an exposure section of the lens-fitted photo film unit in FIG. 1.

The exposure section 26 has a light-shielding tube 48 protruding forwardly from the main body 29. As shown in FIG. 3, the light shielding tube 48 has a nearly rectangular shape, and on a front face thereof a shutter opening 48a is formed. The light-shielding tube 48 is provided with a shutter device 40, which includes a shutter drive member 51 or lever, a transmission member 52 or lever, two shutter blades 53, 54, a spring 59, and the hitting lever 60. The shutter drive member 51, the transmission member 52 and the two shutter blades 53, 54 are covered with a shutter cover 56 provided with the taking lens 13.

The shutter drive member 51 is rotatably attached to a shaft 58 formed on the front face of the light-shielding tube 48, and biased by the spring 59. The shutter drive member 51 has a receive portion 51a for contacting to the hitting lever 60, a cam pin 51b for movably fitting in an end cam groove 52c of the transmission member 52, and a switch depressing portion 51c.

On the transmission member 52, an end guide pin 52a and an axial hole 52b are formed. In the axial hole 52b, a pin 63 formed on the light-shielding tube 48 is fitted. Thus, the transmission member 52 is swingably attached to the light-shielding tube 48.

The end guide pin 52a provided at an end of the transmission member 52 is fitted to be movable in guide grooves 53c, 54c which are formed in the shutter blades 53, 54 respectively. The two shutter blades 53, 54 are rotatably attached to the shutter cover 56, as a rotational shaft 64 provided on a back of the shutter cover 56 is inserted in axial holes 53b and 54b. Accordingly, positions of the attached shutter blades 53, 54 are determined relative to an optical axis L of the taking lens 13.

Figure 4A:
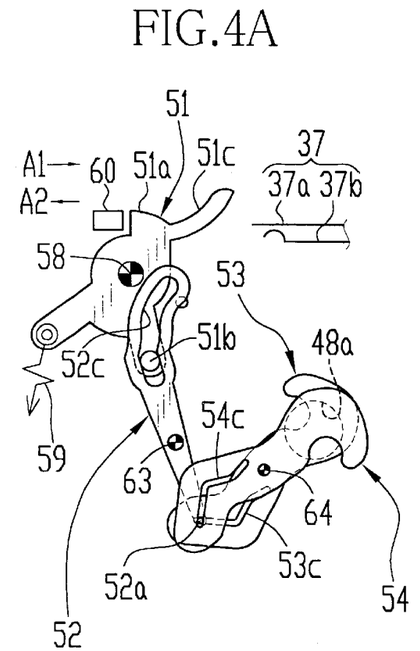
FIG. 4A is a front view of the shutter device of the present invention, and illustrates a situation before photographic movement.
Figure 4B:
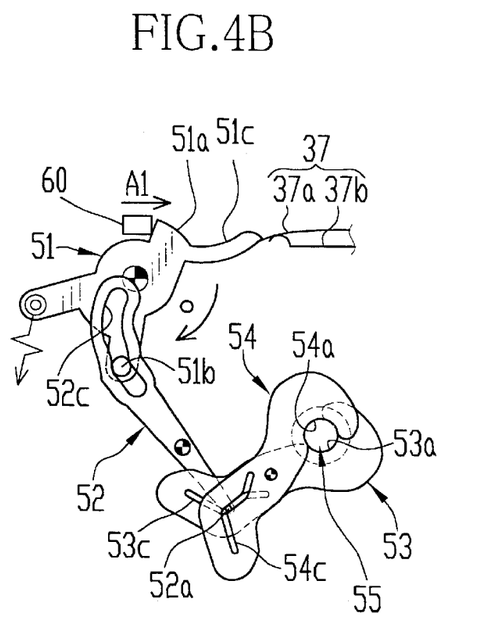
FIG. 4B is a same view as FIG. 4A, and illustrates a situation in photographic movement.

FIG. 4A illustrates a situation of a shutter mechanism before photographing operation, in which the shutter drive member 51 and the hitting lever 60 are set to a primary position. The shutter opening 48a is entirely closed by the shutter blades 53 and 54. In accordance with the photographing operation, the hitting lever 60 slides in a direction A1 to contact to the receive portion 51a of the shutter drive member 51. Then the hitting lever 60 hits the shutter drive member 51 which may rotate in a clockwise direction in the figure against the bias of the spring 59. Thus the hitting lever 60 and the shutter drive member 51 reach a first middle position illustrated in FIG. 4B. The rotation of the shutter drive member 51 causes to rotate the transmission member 52 in a counterclockwise direction. In accordance with the rotation of the transmission member 52, the end guide pin 52a moves in the guide grooves 53c, 54c. Accordingly the two shutter blades move oppositely to each other, and the exposure opening 48a opens gradually. When the shutter blades 53, 54 open to be set to the position illustrated in FIG. 4B, recesses 53a, 54a are combined to form a small stop opening 55 of f11 that has nearly a circular shape. Further, in the rotation of the shutter drive member 51, the switch depressing portion 51c depresses the segment 37a to contact to the segment 37b, and the sync switch turns ON.

Figure 4C:
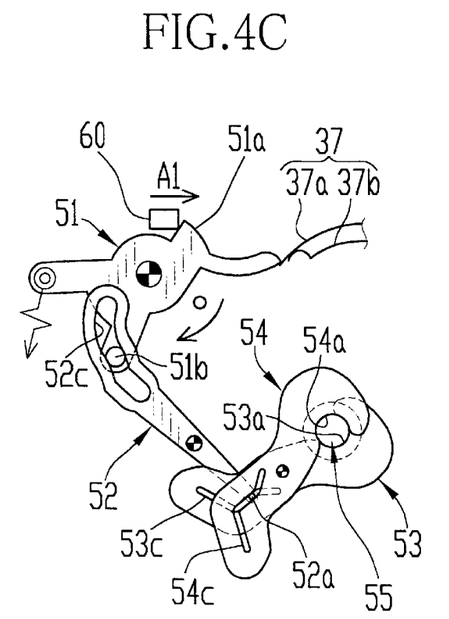
FIG. 4C is a same view as FIG. 4B.

When the hitting lever 60 further slides in the direction A1, the hitting lever 60 and the shutter drive member 51 reach a second middle position illustrated in FIG. 4C.

Thereby middle parts of the guide grooves 53c, 54c are disposed on an orbit of the end guide pin 52a. Accordingly, the shutter blades 53, 54 don t swing from the position illustrated in FIG. 4B, and the small stop opening 55 is continuously formed by the shutter blades 53 and 54, while the shutter drive member 51 swings from the first middle position to the second middle position.

The shutter release lever 60 slides further in the direction A1. The switch depressing portion 51c leaves the segment 37a, and the sync switch 37 turns OFF. Further the end guide pin 52a moves in the guide groove 53c, 54c to rotate the shutter blades 53, 54. Thereafter, the hitting lever 60 leaves the receive portion 51a, and the hitting lever 60 and the shutter drive member 51 reach an end position illustrated in FIG. 4D. Thereby the shutter opening 48a is entirely exposed to form a fully open stop of F5.6. Further, the shutter drive member 51 contacts to a stopper 61 such that the clockwise rotation may be restricted, and is biased by the spring 59 to swing back to the primary position.

Note that the lower segment 37b is so short as not to contact to the switch depressing portion 51c. Accordingly, when the shutter drive member 51 swings back, the switch depressing portion 51c does not contact to the segment 37b, and slightly presses the upper segment 37a upward.

The operation of the present invention will be explained now. In order to carry out the soft focus photography, the lens-fitted photo film unit 11 including the shutter device 40 of the present invention is always used for flashlight photograph, except of a fine weather. Accordingly, before taking a photograph, the flash operation member 16 is slid to set in an ON position and start the flash device charging.

When the winding wheel is rotated, the photo film 34 is wound for one frame to set behind the exposure aperture. Thereby the shutter is set to the charged condition, and the rotation of the winding wheel 22 is locked. In this condition, the end guide pin 52a is located at ends of guide grooves 53c, 54c, and as shown in FIG. 4A, the shutter blades 53, 54 close the shutter opening 48a.

After determining the subject distance as 3 m, the shutter button 18 is depressed. Thus the hitting lever 60 presses the receive portion 51a to swing in the clockwise direction of the figure. Thereby the cam pin 51b presses an inner side of the end cam groove 52c to swing the transmission member 52 in the counterclockwise direction. In accordance with the swing of the transmission member 52, the end guide pin 52a shifts to open the shutter blades 53, 54.

Thus the shutter opening 48a gradually appears behind the shutter blades 53, 54, and the light from the object enters the shutter opening 48a into the light-shielding tube to make an exposure. During the rotation of the shutter drive member 51, the transmission member 52 continuously swings, and the end guide pin 52a reaches the middle part of the guide grooves 53c, 54c. However the shutter blades 53, 54 stop for a while after the recesses 53a, 54a form the small stop opening 55 of f11. See FIGS. 4B and 4C. This situation is kept for approximately 3–4 msec while the end guide pin 52a moves in the guide grooves 53c, 54c.

After the small stop opening 55 is formed, the switch depressing portion 51c of the shutter drive member 51 presses the segment 37a to contact to the segment 37b. When the sync switch 37 turns ON, the flashlight is emitted. An object distance of the taking lens 13, which is determined as a distance from the photo film 34 to an in-focus object, is fixed to 6 m. When the exposure is carried out through the small stop opening 55, a diameter of circle of confusion is about 0.015 mm in setting the subject distance to 3 m. Under this condition, while the small stop opening 55 is formed, the sharp image of the object is formed.

Figure 4D:
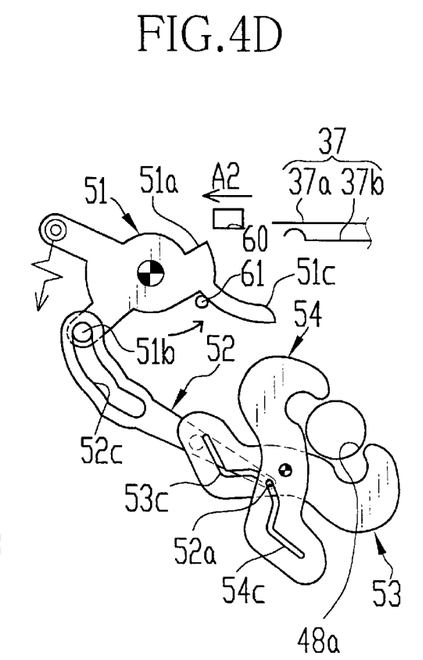
FIG. 4D is a same view as FIG. 4C, and illustrates a situation in which an exposure opening is entirely open in the photographic movement.

Thereafter, the swing of the transmission member 52 is continued. After the end guide pin 52a passes through the middle parts of the guide grooves 53c, 54c, the shutter blades 53, 54 begin to open furthermore, such that the shutter opening 48a entirely appears to form the fully open stop of f5.6, as shown in FIG. 4D.

The shutter drive member 51, after contacting to the stopper 61 rotates toward the primary position, because of the spring 59. The fully open stop is entirely maintained for $\frac{1}{60}$ sec. In this case, when the object stands at a subject distance of about 3 m from the taking lens 13 whose object distance is determined to 6 m, the diameter of circle of confusion of the taking lens 13 is about 0.03 mm. Accordingly, the image of the object is exposed in a slightly softened manner.

When the shutter drive member 51 is swung back in a direction A2 by the spring 59, the shutter blades 53, 54 move in the closing directions to form the small stop opening 55. While the shutter drive member 51 swings from the second middle position to the first middle position, the small stop opening 55 is kept formed for 3–4 msec. However, as the switch depressing portion 51c of the shutter drive member 51 does not turn the sync switch ON, the flashlight is not emitted. Accordingly, the exposure during the swing back to the primary position has small influence on the formed images on the photo film 34. Thereafter, the shutter drive member 51 is swung by the spring 59 to the primary position in FIG. 4A to entirely close the shutter opening 48a.

Figure 5:
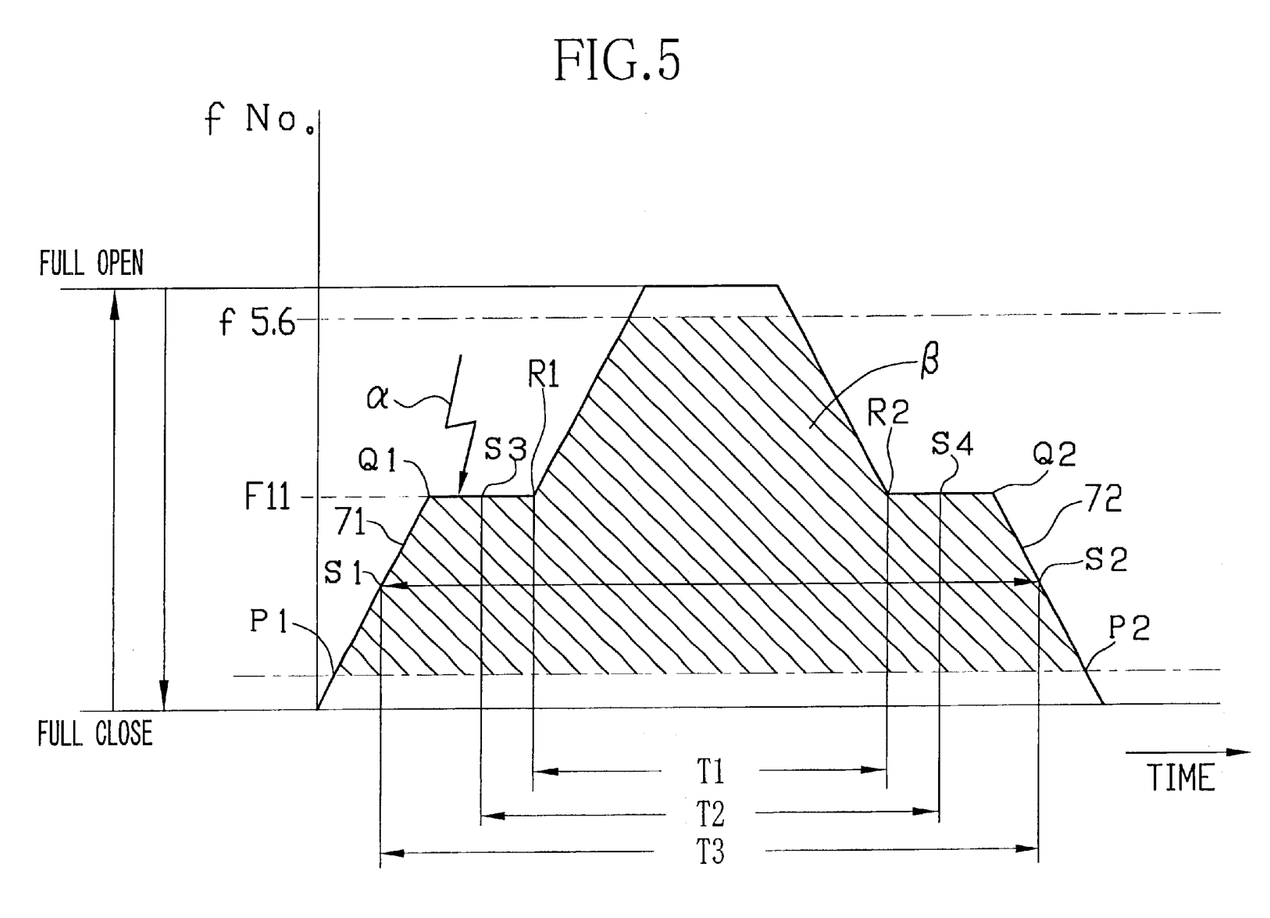
FIG. 5 is a graph illustrating a variation of f-number in the photographic movement.

FIG. 5 illustrates a variation of f-number depending on time while the shutter blades 53, 54 move from the closed position to the open position. P1 is a point at which the shutter opening 48a begins to appear by opening the shutter blades 53, 54. At point Q1, the shutter drive member 51 and the hitting lever 60 are in the first middle position, and the shutter blades 53, 54 open to form the small stop opening 55 of f11. At a point R1, the shutter drive member 51 and the hitting lever 60 are in the second middle position, and the shutter blades 53, 54 forming the small stop opening 55 begin to open moreover so as to expose the fully open stop of f5.6. At a point R2, the shutter drive member 51 and the hitting lever 60 are in the second middle position, and the shutter blade 53, 54 swinging for closing form the small stop opening 55 again. At a point Q2, the shutter drive member 51 and the hitting lever 60 are in the first middle position, and the shutter blades 53, 54 forming the small stop openings 55 begin to close moreover. At a point P2, the shutter blades 53, 54 close to entirely cover the shutter opening 48a. Further, S1 is a middle point of an increasing section 71 defined between P1 and Q1, and S2 is a middle point of a decreasing section 72 defined between P2 and Q2. S3 is a middle point between Q1 and R1, and S4 is a middle point between Q2 and R2, which are corresponding to halftimes of sections in which the small stop opening 55 is formed. Note that the arrow a shows a timing of starting emission of the flashlight. Further, the area shows an exposure amount on the photo film 34.

A difference of time between S2 and S1 is an averaged exposure time t1 according to the small stop opening 55, which is about $\frac{1}{35}$ sec. A difference of time between R2 and R1 is an averaged exposure time t2 according to the fully open stop, which is about $\frac{1}{60}$ sec. A difference of time between S4 and S3 is an averaged exposure time t3 according to combination of the small stop and the fully open stop, which is about $\frac{1}{50}$ sec. In this combination, as the sharp image taken through the small stop opening 55 and the adequately softened images taken through the fully open stop are formed on a frame, the image having a core and softness is formed. Note that such a portrait photograph should be taken with the lens-fitted photo film unit 11 in the evening or cloudy day in order to increase the effect of the flashlight. When the lens-fitted photo film unit 11 is used in the fine day, the portrait photograph should be made in a rear light or a half rear light.

When the front lighted photograph is made with the lens-fitted photo film unit 11, the effect of the flashlight is not large. Accordingly the photography may be carried out with the flash charger switch set in the OFF situation. In this case, as the amount of the incident light from the object is large, the exposure on the photo film 34 is also made through the small stop opening 55 formed by the shutter blades 53, 54 during the swing for closing.

In the above embodiment, the focal length of the taking lens is set to 32 mm, but may be set to 50 mm, for example. In this case, the object is at a distance of about 4–4.5 m from the lens-fitted photo film unit 11 when the portrait photography is carried out. If the lens-fitted photo film unit 11 is so constructed that the object distance to an in-focus object is 6 m, the diameter of circle of confusion according to the small stop of f11 is 0.015 mm, and that according to the fully open stop of f5.6 is about 0.03 mm for the object at a subject distance of 4.3 m from the lens-fitted photo film unit 11. The result is the same as the above embodiment.

In the present invention, the flashlight can be emitted while the small stop opening 55 is formed during the closing swing of the shutter blades 53, 54, instead of the opening swing. The shape of the small stop opening is not restricted in circle, but may be also nearly circular form, for example, hexagonal.

Further, in the present invention, the f-numbers of the fully open stop and the small stop are not restricted in f5.6 and f11, respectively. For example, the f-number of the fully open stop may be smaller than f8, to determine a larger aperture diameter. The f-number of the small stop may be larger than f10, to determine a smaller aperture diameter.

In the above embodiment, the averaged exposure time t1 according to exposure through the small stop is about 1/35 second, the averaged exposure time t2 according to exposure through the fully open stop is about 1/60 second, and the averaged exposure time t3 according to exposure in combination of the small stop and the fully open stop is about 1/50 second. However, the present invention is not restricted in them. The averaged exposure time t1, the averaged exposure time t2 and the averaged exposure time t3 may be respectively about 1/50, 1/100 and 1/70 second, when the photo film has higher sensitivity (such as ISO 800, ISO 1600).

In the above embodiment, while the small stop is formed, the middle parts of the grooves of the shutter blades extend on the orbit of the end guide pin of the transmission member or lever. However, in the present invention, a middle part of the end cam groove of the transmission member or lever may extend on an orbit of the cam pin of the shutter drive member or lever.

Further, the present invention is not applied only to the lens-fitted photo film unit but also to a simple camera in which the photo film is changed and the focus mechanism and exposure adjusting mechanism are omitted. Further even when a simple camera having a focus mechanism, the soft focus photography of the present invention can be carried out with the shutter device of the present invention. In this case, the object distance to the object for focusing is set to a predetermined value, for example, 6 m.

Various changes and modifications are possible in the present invention and may be understood to be within the present invention.

What is claimed is:

1. A shutter device included in a camera which is provided with a shutter opening positioned at a taking lens, for opening and closing said shutter opening to make an exposure of a photo film in response to a photographing operation, said shutter device comprising:

a shutter drive member for swinging from a primary position to an end position responding to said photographing operation, and thereafter back to said primary position;

at least one shutter blade movable between a closed position, a small stop position, and an open position, for entirely covering said shutter opening when in said closed position, for partially exposing said shutter opening when in said small stop position, and for entirely exposing said shutter opening when in said open position; and a transmission member for connecting said shutter drive member with said shutter blade, said transmission member being actuated in accordance with the moving of said shutter drive member to said end position, for moving said shutter blade from said close position to said small stop position, and for keeping said shutter blade in said small stop position for a predetermined time, and thereafter for moving said shutter blade from said small stop position to said open position;

wherein said camera further includes a flash device for emitting a flashlight, and said flash device is actuated while said shutter blade is set to said small stop position.

2. A shutter device according to claim 1, wherein said transmission member is actuated in accordance with the moving of said shutter drive member back to said primary position, moves said shutter blade from said open position to said small stop position, keeps said shutter blade is set in said small stop position for a predetermined time, and thereafter moves said shutter blade from said small stop position to said close position.

3. A shutter device according to claim 2, wherein said shutter drive member is biased toward said primary position by spring biasing.

4. A shutter device according to claim 2, wherein said shutter blade comprises two blade members having a same rotational shaft, for rotating in directions opposite to one another, and said shutter opening is opened gradually from a center by the rotation of said two blade members, or closed gradually from an outside.

5. A shutter device according to claim 4, wherein said transmission member is rotatably provided, and one end thereof is engaged with said shutter drive member, and one other end thereof is engaged with said blade members such that the rotation of said shutter drive member may be transmitted to said blade members.

6. A shutter device according to claim 5, wherein said shutter drive member has a cam pin for fitting in an end cam groove formed at said one end of said transmission member.

7. A shutter device according to claim 5, wherein an end guide pin is provided at said one other end of said transmission member and fitted in a guide groove formed in each of said two blade members, said blade members swing oppositely by the moving of said end guide pin along said guide groove when said transmission member rotates.

8. A shutter device according to claim 7, wherein when said shutter blade is in said small stop position, a middle portion of said guide groove extends in an orbit direction of said end guide pin, and said end guide pin moves in said middle portion of said guide groove.

9. A shutter device according to claim 2, wherein said shutter blade is in said open position when said shutter drive member is in said end position.

10. A shutter device according to claim 9, wherein an f-number determined by setting said shutter blade in said open position is smaller than f8.

11. A shutter device according to claim 10, wherein said f-number determined by setting said shutter blade in said small stop position is larger than f10.

12. A shutter device according to claim 11, wherein an object distance of said taking lens is substantially 6 m.

13. A shutter device according to claim 2, wherein said camera is a lens-fitted photo film unit.

14. A shutter device according to claim 1, wherein said camera further comprises a sync switch for actuating said flash device, said shutter drive member has a switch depressing portion for pressing said sync switch, and said switch depressing portion presses said sync switch in accordance with rotation of said shutter drive member to actuate said flash device.

15. A shutter device included in a camera which is provided with a shutter opening positioned at a taking lens, for opening and closing said shutter opening to make an exposure of a photo film in response to a photographing operation, said shutter device comprising:

a shutter drive member for swinging from a primary position to an end position responding to said photographing operation, and thereafter back to said primary position;

at least one shutter blade movable between a closed position, a small stop position, and an open position, for entirely covering said shutter opening when in said closed position, for partially exposing said shutter opening when in said small stop position, and for entirely exposing said shutter opening when in said open position; and a transmission member for connecting said shutter drive member with said shutter blade, said transmission member being actuated in accordance with the moving of said shutter drive member to said end position, for moving said shutter blade from said close position to said small stop position, and for keeping said shutter blade in said small stop position for a predetermined time, and thereafter for moving said shutter blade from said small stop position to said open position;

wherein the shutter device is arranged so that the primary position of the shutter drive member is the same for every exposure and the end position of the shutter drive member is the same for every said exposure.

16. The shutter device of claim 15, further comprising a stopper arranged so that the stopper stops the swinging of the shutter drive member at the end position.

17. A shutter device included in a camera which is provided with a shutter opening positioned at a taking lens, for opening and closing said shutter opening to make an exposure of a photo film in response to a photographing operation, said shutter device comprising:

a movable shutter drive member urged by a spring force to a primary position;

a means for striking the shutter drive member to move the shutter drive member against the spring force away from the primary position to an end position in accordance with said photographing operation, the shutter drive member being moved back to said primary position by the spring force;

at least one shutter blade movable between a closed position, a small stop position, and an open position, wherein the at least one shutter blade entirely covers said shutter opening when in said closed position, partially exposes said shutter opening when in said small stop position, and entirely exposes said shutter opening when in said open position; and a transmission member for connecting said shutter drive member with said shutter blade, said transmission member being actuated in accordance with the moving of said shutter drive member to said end position, for moving said shutter blade from said close position to said small stop position, and for keeping said shutter blade in said small stop position for a predetermined time, and thereafter for moving said shutter blade from said small stop position to said open position.

18. The shutter device of claim 17, further comprising a stopper arranged so that the stopper stops the movement of the shutter drive member at the end position.

* * * * *